June 24, 1941.  C. R. HUBBARD  2,246,591
MACHINERY PACKING
Filed June 10, 1940

INVENTOR
Cecil R. Hubbard,
BY
Fraser, Myers & Manley,
ATTORNEYS.

Patented June 24, 1941

2,246,591

UNITED STATES PATENT OFFICE 2,246,591

MACHINERY PACKING

Cecil R. Hubbard, Palmyra, N. Y., assignor to The Garlock Packing Company, Palmyra, N. Y., a corporation of New York Application June 10, 1940, Serial No. 339,704

3 Claims. (Cl. 288—3)

This invention relates to improvements in machinery packings, and is particularly adapted for use as a means of sealing the annular space between a rotatable shaft and its housing or between other analogous relatively movable machine elements.

It is an object of the invention to provide an oil-sealing device comprising a flexible sealing element and spring-controlled contractile means therefor which may be assembled in a shell to be mounted fluid-tight in the housing surrounding a shaft to be encircled by the sealing element, the contractile element comprising two members, one slidable with respect to the other, to provide for movements of the shaft to positions concentric with respect to the axis of the housing due to wear, oscillation or other causes.

In the accompanying drawing illustrating a preferred form of the invention—

Figure 1:
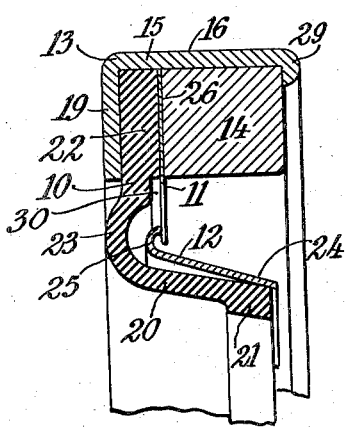
Figure 1 is a fragmentary cross-sectional view of an oil-seal device embodying the invention, the parts being indicated in their normal positions which they assume when not assembled with parts of the machine in which they are to be used.

The oil-sealing device hereinbefore referred to may comprise in general a flexible sealing element 10 and contractile means therefor consisting of a spring 11 and a flanged conical member 12 which may be held in assembled relation with a metal shell 13 by means of an annular clamping ring 14.

The metal shell 13 may consist of an annular portion 15 having a cylindrical outer surface 16 to be mounted in fluid-tight contact with the inner surface of a portion of the housing 17 surrounding a part of the shaft 18 with which the sealing device is intended to be used. The element 15 of the shell may have at one of its margins an inwardly disposed flange 19 having an inner margin of materially greater diameter than the diameter of the part of the shaft which it surrounds.

The flexible sealing element 10 may include a sleeve-like portion 20 adapted to encircle a part of the shaft 18 to be surrounded by the shell. This sleeve-like portion of the sealing element may have at one of its margins a terminal lip 21 adapted to be held in a sealing relation with the shaft, and it may be provided at its opposite margin with an outwardly disposed flange 22 adapted to have contact with and be backed up by the flange 19 of the shell. This flange 22 may be connected with the sleeve-like portion 20 by a flexible hinge-like portion 23 of reverse curvature. It is the purpose of the hinge-like connection 23 of the sealing device, which might aptly be designated a gooseneck connection, to provide an ample degree of flexibility between the sleeve-like portion of the sealing element and its flange in order to allow for relative movements of said parts occasioned by movements of the shaft to positions concentric with respect to the axis of the housing due to wear, oscillation or other causes. This gooseneck connection between the sleeve and flange of the sealing element is disclosed and claimed broadly in applicant's copending application Serial No. 339,225, filed June 7, 1940, and is claimed in this application only in combination with applicant's above-mentioned spring-controlled contractile means comprising two elements having a sliding connection to be hereinafter more specifically described.

The dimensions and degree of inclination of the conical element 12, which under control of the spring 11 is relied upon as means whereby the lip of the sealing element may be held in its sealing relation with the shaft, may be such that one of its marginal portions 24 only will make contact with the terminal lip 21 of the sealing element. The other marginal portion of the conical element may be provided with an outwardly disposed, reversely curved flange 25 adapted, when the parts are in their normal positions, to be in sliding contact with the surfaces of inner marginal portions of the spring 11 which face the adjacent gooseneck connecting portion of the sealing element.

Figure 4:
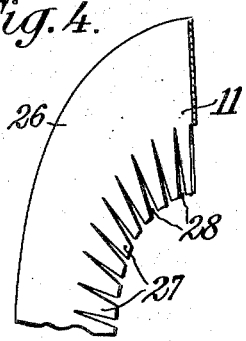
Fig. 4 is a fragmentary perspective view of a spring also designed to be used as a part of the device illustrated by Fig. 1 and by which the contractile element illustrated by Fig. 3 may be yieldably held in its effective relation with the sealing element.
Figure 3:
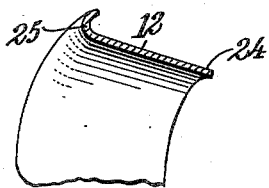
Fig. 3 is a fragmentary perspective view of a conical element adapted for use as a part of the device illustrated by Fig. 1 by which a flexible sealing element will be contracted and held in snug contact with the shaft with which it is designed to be used.

The spring 11, as is clearly indicated in Fig. 4, may consist of an outer annular portion 26, by which it may be held in an assembled relation with other parts of the device, and a circumferential series of inwardly directed fingers 27 separated by spaced incisions 28 which may extend outwardly for any desired distance from the inner margin of the spring.

The flange 22 of the sealing element, the outer portion 26 of the spring, and the clamping ring 14 may be held in a state of compression between the marginal flange 19 of the shell which backs the flange of the sealing element and a lip 29 which may be rolled inwardly for such purpose from the opposite margin of the shell.

Figure 2:
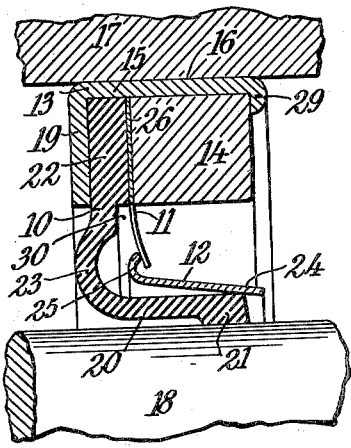
Fig. 2 is a fragmentary cross-sectional view of the oil-sealing device illustrated by Fig. 1 as applied to a shaft and its housing.

The degree of inclination of the conical element 12 of the contractile means for the sealing lip may be such that, when the lip is expanded to assemble it with the shaft as indicated by Fig. 2, the conical element will be caused to move to the right, as indicated in said figure, against the opposing effort of the fingers of the spring 11 and will cause said fingers to be flexed, after which they will constantly and yieldingly tend to move the cone in an axial direction toward the left and maintain the lip 21 in snug engagement with the shaft.

The gooseneck connection 23 between the sleeve of the sealing element and its flange 22 and the sliding connection between the flange 25 of the conical element 12 and the spring 11 are designed to cooperate with each other as a means whereby ample provision is made for lateral movements of the sleeve and the conical element with respect to the axis of the housing which may result from wear, or from oscillation of the shaft, or from other causes.

It will be apparent that the invention is not limited to a construction in which the clamping ring 14 is employed, as distinguished from one in which the flange 22 of the sealing element and the portion 26 of the spring might be assembled and held under compression between a shell of relatively shallow axial dimensions having parts otherwise conforming with the flange 19 and lip 29. The use of the clamping ring 14 as a spacing element between the part 26 of the spring and the lip 29 makes it possible to assemble the parts in a shell of any appropriate axial dimensions which, if desired, may be such as to surround and protect all parts of the sealing element and its contractile means as indicated in the accompanying drawing.

The employment of a sealing element and spring of forms and dimensions such as to provide a recess 30 immediately within the marginal portions of the assembly which are subjected to compression, in order that such compression may not cause material resulting from deformation of the flange of the sealing device to flow to a position such as to crowd the spring and disturb its intended adjustment with respect to the conical element of the contractile means for the lip of the sealing device, is not an invention of this applicant and is not claimed in this application, but is disclosed and claimed in an application, Serial No. 339,122, filed June 6, 1940, by Edward W. Fisher, Jr. et al., which application and invention are assigned to the assignee of this application and the invention disclosed herein.

The invention is not intended to be limited to the specific form herein disclosed for purposes of illustration, but should be regarded as covering modifications and variations thereof within the scope of the appended claims.

What is claimed is:

1. A device adapted to seal the space between a shaft and its housing; said device comprising a metal shell to be mounted fluid-tight in the housing and having an inwardly disposed marginal flange of dimensions such as to clear the shaft; a flexible sealing element having a sleeve to extend along a part of the shaft to be surrounded by the shell, said sleeve terminating at one margin in a lip to be held in contact with the shaft and having at its opposite margin an outwardly disposed flange backed against the flange of the shell; a thin sheet-metal spring comprising a radially disposed, annular, outer portion and a circumferential series of inwardly extending flexible fingers; means comprising an inturned lip on the margin of the shell opposite that which backs the flange of the sealing element by which the outer element of the spring and the flange of the sealing element may be clamped in a state of compression between said lip and said flange of the shell; and a conical element surrounding and extending along a portion of said sleeve by means of which its sealing lip may be maintained in its sealing relation with the shaft, said conical element having a terminal, marginal portion so disposed as to encircle the terminal lip of the sealing element and having at its opposite margin an outwardly disposed flange adapted to be maintained in sliding contact with the surfaces of the inner end portions of the resilient fingers of the spring which face the adjacent portion of the sealing element, the relative forms and dimensions of said parts being such that when they are in the relative positions which they normally assume on being assembled, but before the device is applied to the shaft, the shoulder on the conical element will not be caused to flex the fingers of the spring, but such that the expansion of the terminal lip of the sealing element, when applied to the shaft, will cause the flange of the conical element to move axially in a direction such as to flex the fingers of the spring which, when so flexed, will tend to move the conical element in the reverse direction and thereby contract the lip of the sealing device and maintain it in snug contact with the shaft.

2. The device defined by claim 1, of which the means for clamping component parts in an assembled relation includes an annular ring adapted to be held in a state of compression between and thereby separate the flange of the sealing element and its spring from the lip of the shell.

3. The device defined by claim 1, of which the sleeve of the sealing element is connected with its flange by means of a flexible, hinge-like, gooseneck portion of reverse curvature.

CECIL R. HUBBARD.